US012614258B2

(12) United States Patent
Yeh et al.

(10) Patent No.: US 12,614,258 B2
(45) Date of Patent: Apr. 28, 2026

(54) IMAGE PROCESSING CIRCUIT AND METHOD HAVING OUTPUT TIMING ADJUSTMENT MECHANISM

(71) Applicant: REALTEK SEMICONDUCTOR CORPORATION, Hsinchu (TW)

(72) Inventors: Tzu-Min Yeh, Hsinchu (TW); Kai-Cho Chang, Hsinchu (TW); Po-Hsien Wu, Hsinchu (TW); Hsu-Jung Tung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 375 days.

(21) Appl. No.: 18/224,339

(22) Filed: Jul. 20, 2023

(65) Prior Publication Data

US 2024/0070824 A1 Feb. 29, 2024

(30) Foreign Application Priority Data

Aug. 26, 2022 (TW) .................................. 111132387

(51) Int. Cl.
*G06T 5/73* (2024.01)
*G06T 3/4053* (2024.01)

(52) U.S. Cl.
CPC .............. *G06T 5/73* (2024.01); *G06T 3/4053* (2013.01); *G06T 2207/20192* (2013.01)

(58) Field of Classification Search
CPC .................... G06T 5/73; G06T 3/4053; G06T 2207/20192
See application file for complete search history.

(56) References Cited

U.S. PATENT DOCUMENTS

2007/0273753 A1* 11/2007 Lee .................... H04N 21/4334
                                                            348/14.02
2010/0054714 A1* 3/2010 Fujii .................... G11B 27/005
                                                            386/241

(Continued)

FOREIGN PATENT DOCUMENTS

TW      200743380 A      11/2007
TW      200840355 A    * 10/2008
TW      I733341 B         7/2021

OTHER PUBLICATIONS

PhotoFast, "4K-Gamer1116", 2020, https://www.photofast.com/home-2/products/4kgamerplus/.

(Continued)

*Primary Examiner* — Jennifer Mehmood
*Assistant Examiner* — Vaisali Rao Koppolu
(74) *Attorney, Agent, or Firm* — WPAT, PC

(57) ABSTRACT

The present disclosure discloses an image processing circuit having output timing adjustment mechanism. An image enhancement circuit performs image enhancement on an input image to generate an enhanced image. A first image processing path and a second image processing path respectively perform processing on the enhanced image having a first timing and the enhanced image having a second timing to generate a first output image and a second output image. A timing control circuit adjusts the timing of the enhanced image according to requirements of the first image processing path and the second image processing path to generate the enhanced image having the first timing and the enhanced image having the second timing. A first image output interface outputs the first output image. A second image output interface outputs the second output image.

18 Claims, 3 Drawing Sheets

(56) References Cited

U.S. PATENT DOCUMENTS

2012/0287133 A1* 11/2012 Lee .......................... G09G 5/14
345/428
2021/0264566 A1* 8/2021 Yu ......................... G06T 3/4046

OTHER PUBLICATIONS

"4K-Gamer +" 1116, PhotoFast.
PChome.com, "AVerMedia GC553 Live Gamer Ultra 4Kp60 HDR
Live Capture Box", Jul. 6, 2022, http://24h.pchome.com.tw/prod/
DMAAA2-A9009QE70?fq=/S/DMAAAW.

* cited by examiner

300

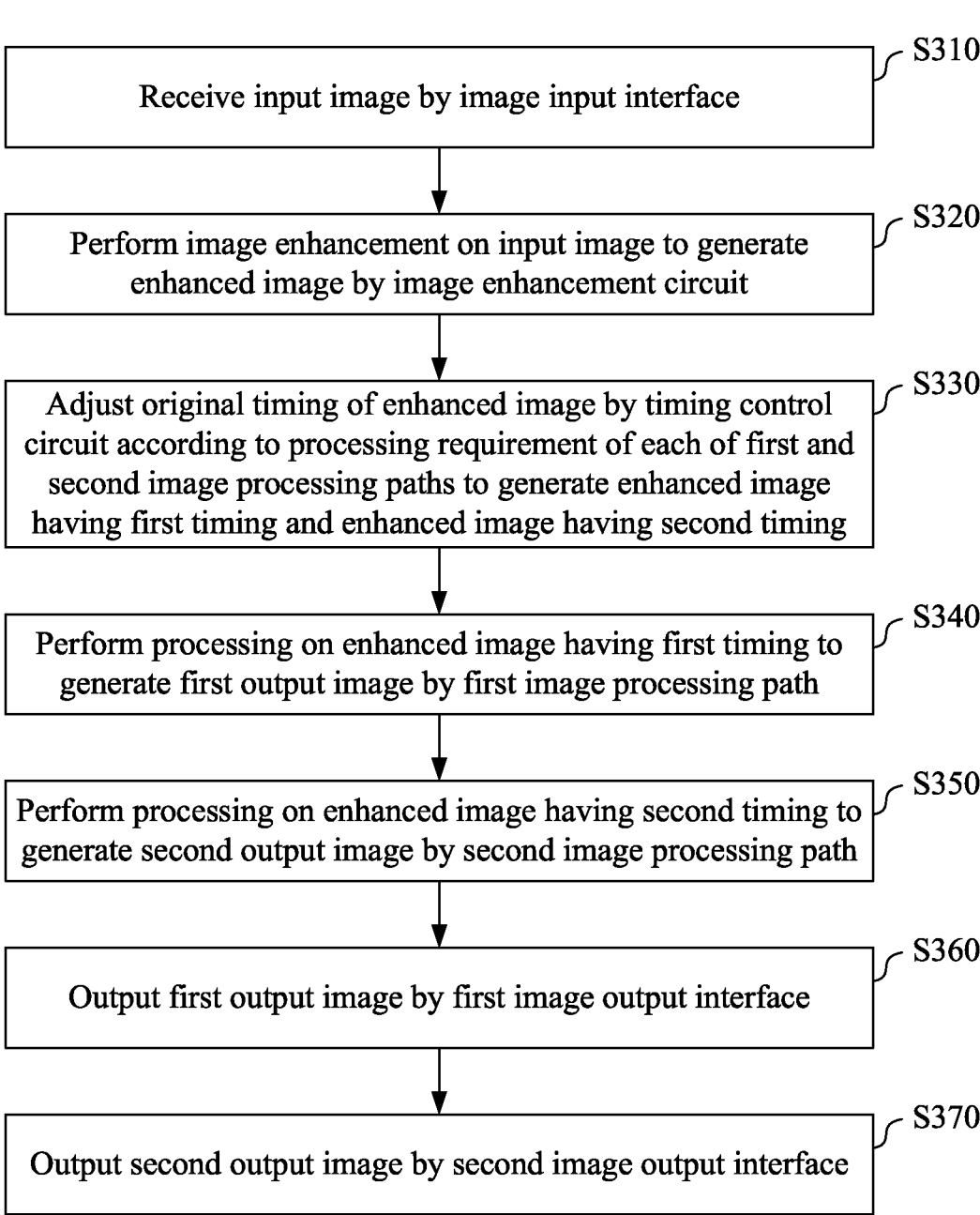

S310

Receive input image by image input interface

S320

Perform image enhancement on input image to generate enhanced image by image enhancement circuit

S330

Adjust original timing of enhanced image by timing control circuit according to processing requirement of each of first and second image processing paths to generate enhanced image having first timing and enhanced image having second timing

S340

Perform processing on enhanced image having first timing to generate first output image by first image processing path

S350

Perform processing on enhanced image having second timing to generate second output image by second image processing path

S360

Output first output image by first image output interface

S370

Output second output image by second image output interface

Fig. 3

IMAGE PROCESSING CIRCUIT AND METHOD HAVING OUTPUT TIMING ADJUSTMENT MECHANISM

BACKGROUND OF THE INVENTION

1. Field of the Invention

The present disclosure relates to an image processing circuit and an image processing method having output timing adjustment mechanism.

2. Description of Related Art

In modern daily life, film and television works, video games and live stream shows become indispensable entertainment. However, some image sources are not able to provide a better image quality or playback fluency and are not able to provide different formats of images according to requirements of different electronic apparatuses. If a corresponding image processing mechanism is absent, either the image playback apparatus or the image recording apparatus can not obtain a better playback result or a recording result.

SUMMARY OF THE INVENTION

In consideration of the problem of the prior art, an object of the present disclosure is to provide an image processing circuit and an image processing method having output timing adjustment mechanism.

The present invention discloses an image processing circuit having output timing adjustment mechanism that includes an image input interface, an image enhancement circuit, a first image processing path, a second image processing path, a timing control circuit, a first image output interface and a second image output interface. The image input interface is configured to receive an input image. The image enhancement circuit configured to perform image enhancement on the input image to generate an enhanced image. The first image processing path is configured to perform processing on the enhanced image having a first timing to generate a first output image. The second image processing path is configured to perform processing on the enhanced image having a second timing to generate a second output image. The timing control circuit is configured to adjust an original timing of the enhanced image according to a processing requirement of each of the first image processing path and the second image processing path to generate the enhanced image having the first timing and the enhanced image having the second timing. The first image output interface is configured to output the first output image. The second image output interface is configured to output the second output image.

The present invention also discloses an image processing method having output timing adjustment mechanism used in an image processing circuit that includes steps outlined below. An input image is received by an image input interface. Image enhancement is performed on the input image to generate an enhanced image by an image enhancement circuit. An original timing of the enhanced image is adjusted by a timing control circuit according to a processing requirement of each of a first image processing path and a second image processing path to generate the enhanced image having the first timing and the enhanced image having the second timing. Processing is performed on the enhanced image having a first timing to generate a first output image by a first image processing path. Processing is performed on the enhanced image having a second timing to generate a second output image by a second image processing path. The first output image is outputted by a first image output interface. The second output image is outputted by a second image output interface.

These and other objectives of the present disclosure will no doubt become obvious to those of ordinary skill in the art after reading the following detailed description of the preferred embodiments that are illustrated in the various figures and drawings.

BRIEF DESCRIPTION OF THE DRAWINGS

FIG. 3 illustrates a flow chart of an image processing method having output timing adjustment mechanism according to an embodiment of the present invention.

DETAILED DESCRIPTION OF THE PREFERRED EMBODIMENTS

An aspect of the present invention is to provide an image processing circuit and an image processing method having output timing adjustment mechanism to perform image enhancement first with a common processing path and subsequently set different timings according to different requirements of different image processing paths, so as to generate different image outputs corresponding to different image output interfaces.

Figure 1:
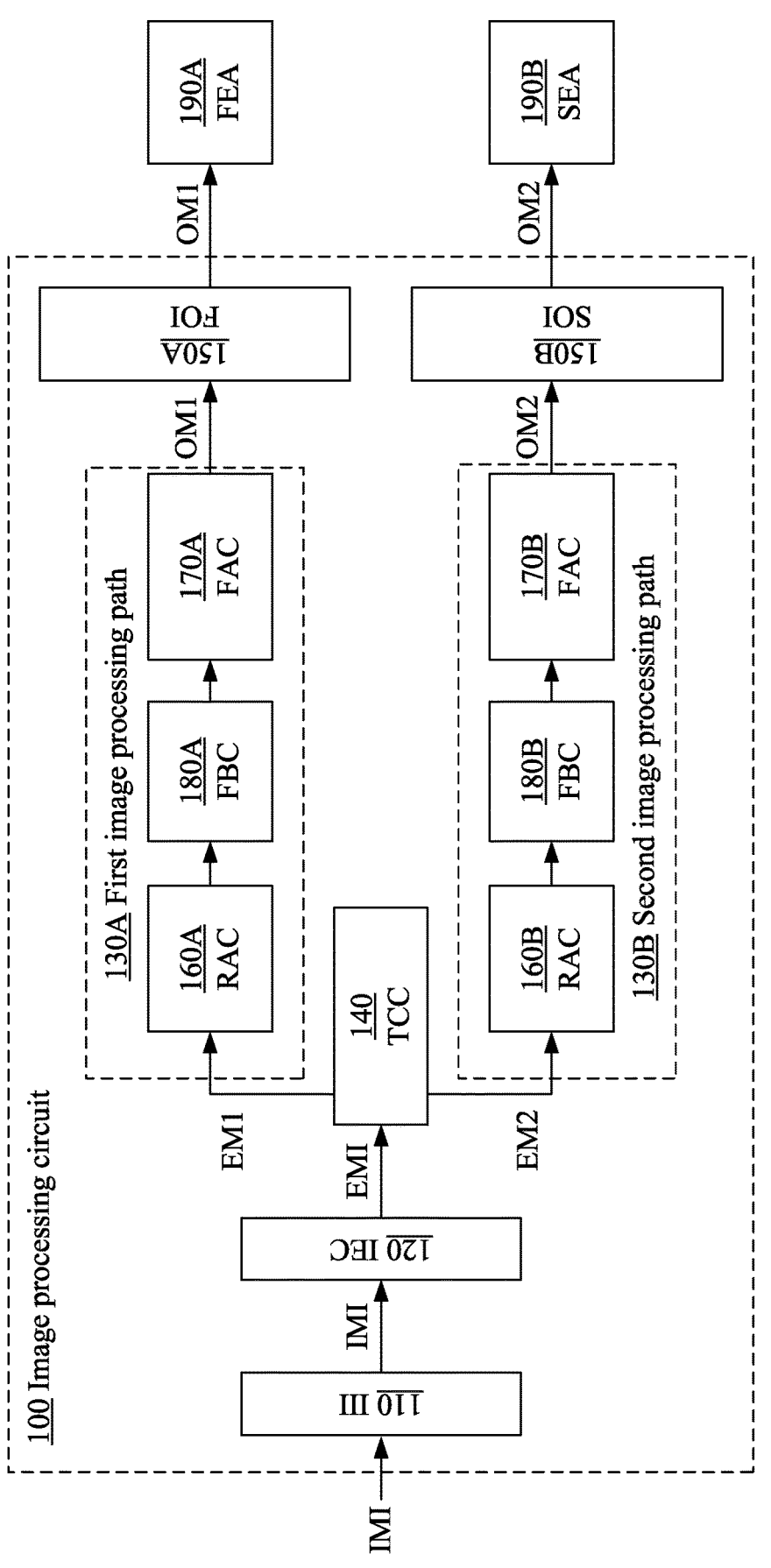
FIG. 1 illustrates a block diagram of an image processing circuit having output timing adjustment mechanism according to an embodiment of the present invention.

Reference is now made to FIG. 1. FIG. 1 illustrates a block diagram of an image processing circuit 100 having output timing adjustment mechanism according to an embodiment of the present invention. The image processing circuit 100 includes an image input interface 110 (abbreviated as III in FIG. 1), an image enhancement circuit 120 (abbreviated as IEC in FIG. 1), a first image processing path 130A, a second image processing path 130B, a timing control circuit 140 (abbreviated as TCC in FIG. 1), a first image output interface 150A (abbreviated as FOI in FIG. 1) and a second image output interface 150B (abbreviated as SOI in FIG. 1).

The image input interface 110 is configured to receive an input image IMI. In an embodiment, the image input interface 110 is high definition multimedia interface (HDMI) and receives the input image IMI from such as, but not limited to a home video game console or a computer.

The image enhancement circuit 120 is configured to perform image enhancement on the input image IMI to generate an enhanced image EMI. In an embodiment, the image enhancement circuit 120 is configured to perform image enlargement, edge enhancement, sharpness enhancement, artificial intelligence super resolution or a combination thereof on the input image IMI to generate the enhanced image EMI.

For example, the image enhancement circuit 120 can perform image enlargement on the input image IMI such that the input image IMI is enlarged to a size of such as, but not limited to 4K. The image enhancement circuit 120 can also perform enhancement or increasing of the sharpness on blur image edges in the input image IMI. Further, the image enhancement circuit 120 can distinguish the contents of the input image IMI into different categories of characteristics, such as but not limited to sky, buildings and grounds, based on the artificial intelligence super resolution technology described in such as but not limited to U.S. patent US20210264566A1, so as to perform different image enhancements on regions of different categories in the image.

The first image processing path 130A is configured to perform processing on an enhanced image EM1 having a first timing to generate a first output image OM1. The second image processing path 130B is configured to perform processing on an enhanced image EM2 having a second timing to generate a second output image OM2.

The first image processing path 130A and the second image processing path 130B may have different processing requirements based on different output targets and different output interfaces, so as to selectively include a resolution adjusting circuit, a frame refresh rate adjusting circuit or a combination thereof.

For example, in FIG. 1, the first image processing path 130A outputs the first output image OM1 through the first image output interface 150A to a first electronic apparatus 190A (abbreviated as FEA in FIG. 1). The first electronic apparatus 190A is an image playback apparatus, and the first image output interface 150A is an interface of HDMI.

Under such a condition, a processing requirement that the first image processing path 130A has may include an instant playback requirement and a first interface requirement of the HDMI interface. Under such a condition, the first image processing path 130A may include a resolution adjusting circuit 160A (abbreviated as RAC in FIG. 1) and a frame refresh rate adjusting circuit 170A (abbreviated as FAC in FIG. 1). The resolution adjusting circuit 160A is configured to adjust the resolution of the image. The frame refresh rate adjusting circuit 170A is configured to adjust the frame refresh rate of the image.

In a practical usage scenario, if the processing requirement is to obtain a clearer display result, the frame refresh rate adjusting circuit 170A can reduce the frame refresh rate of the enhanced image EM1 such that the resolution adjusting circuit 160A keeps the original resolution of the enhanced image EM1. If the processing requirement is to obtain a better display fluency, the frame refresh rate adjusting circuit 170A can keep a higher frame refresh rate of the enhanced image EM1 while the resolution adjusting circuit 160A reduces the resolution of the enhanced image EM1.

The second image processing path 130B outputs the second output image OM2 through the second image output interface 150B to a second electronic apparatus 190B (abbreviated as SEA in FIG. 1). The second electronic apparatus 190B is a non-playback apparatus and the second image output interface 150B is an interface of universal serial bus (USB).

Under such a condition, a processing requirement that the second image processing path 130B has may include a recording requirement and a second interface requirement of the USB interface. Under such a condition, the second image processing path 130B may include a resolution adjusting circuit 160B (abbreviated as RAC in FIG. 1) and a frame refresh rate adjusting circuit 170B (abbreviated as FAC in FIG. 1). The resolution adjusting circuit 160B is configured to adjust the resolution of the enhanced image EM2, such as but not limited to reduce the resolution of the enhanced image EM2 or selectively not adjust the resolution of the enhanced image EM2. The frame refresh rate adjusting circuit 170B is configured to adjust the frame refresh rate of the enhanced image EM2, such as but not limited to increase the frame refresh rate of the enhanced image EM2 to increase the image playback fluency. If a limitation is presented due to the resolution that the non-playback apparatus is able to display or the bandwidth of the USB interface, the frame refresh rate adjusting circuit 170B may also reduce the frame refresh rate of the enhanced image EM2 such that the image transmission is not affected by the limitation described above.

The timing control circuit 140 is configured to adjust an original timing of the enhanced image EMI according to the processing requirement of each of the first image processing path 130A and the second image processing path 130B to generate the enhanced image EM1 having the first timing and the enhanced image EM2 having the second timing.

In an embodiment, the timing control circuit 140 is configured to modify a timing of a vertical synchronization (Vsync) signal, a horizontal synchronization (Hsync) signal, a vertical blanking interval (VBL), a horizontal blanking interval (HBL), an active data location or a combination thereof of the enhanced image EMI to adjust the original timing, to generate the enhanced image EMI having the first timing and the enhanced image EM2 having the second timing.

Since the processing requirements of the first image processing path 130A and the second image processing path 130B are different, the timing control circuit 140 can generate the enhanced image EMI having the first timing such that the path delay of the first image processing path 130A is smaller than a frame delay time. On the other hand, in order to allow the frame refresh rate adjusting circuit 170A and the frame refresh rate adjusting circuit 170B to adjust the frame refresh rate, the first image processing path 130A may include a frame buffer circuit 180A (abbreviated as FBC in FIG. 1) corresponding to the frame refresh rate adjusting circuit 170A to store the enhanced image EM1 and the second image processing path 130B may include a frame buffer circuit 180B (abbreviated as FBC in FIG. 1) corresponding to the frame refresh rate adjusting circuit 170B to store the enhanced image EM2.

After the first image processing path 130A finishes perform processing, the first output image OM1 is generated thereby. After the second image processing path 130B finishes perform processing, the second output image OM2 is generated thereby. The first image output interface 150A is configured to output the first output image OM1 to the first electronic apparatus 190A. The second image output interface 150B is configured to output the second output image OM2 to the second electronic apparatus 190B.

It is appreciated that the embodiment described above is merely an example. In different embodiments, the first image processing path 130A and the second image processing path 130B may include different combinations of the circuits described above and may perform increasing and decreasing of the resolution and the frame refresh rate according to practical requirements. The present invention is not limited to a specific embodiment.

Figure 2:
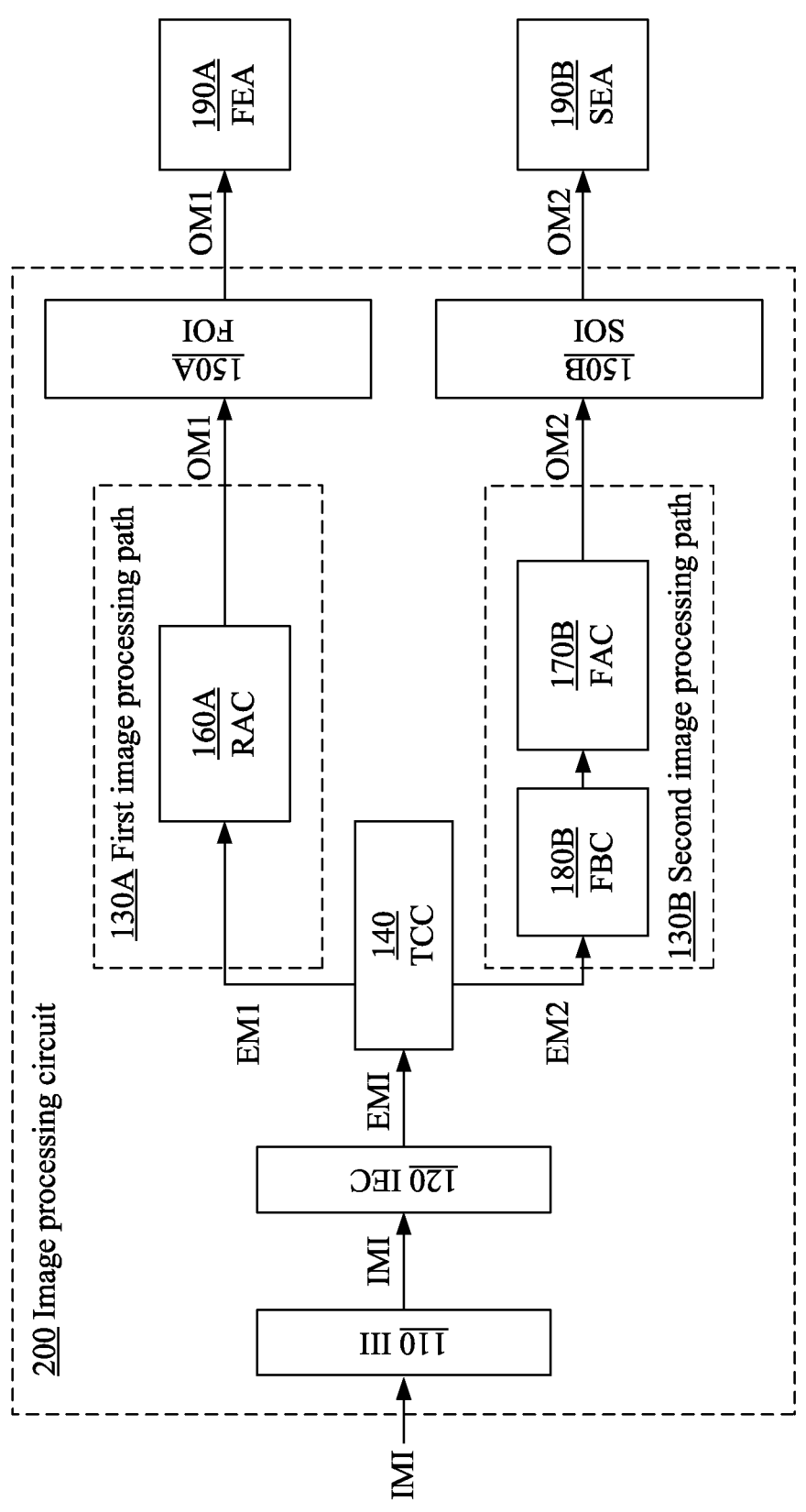
FIG. 2 illustrates a block diagram of an image processing circuit according to an embodiment of the present invention.

FIG. 2 illustrates a block diagram of an image processing circuit 200 according to an embodiment of the present invention. Similar to the image processing circuit 100 in FIG. 1, the image processing circuit 200 also includes the image input interface 110, the image enhancement circuit 120, the first image processing path 130A, the second image processing path 130B, the timing control circuit 140, the first image output interface 150A and the second image output interface 150B. The abbreviations of the components in FIG. 2 are the same as those in FIG. 1 and are not described herein.

In an embodiment, the first image processing path 130A only includes the resolution adjusting circuit 160A to adjust the resolution of the enhanced image EM1 having the first timing. The second image processing path 130B includes the frame refresh rate adjusting circuit 170B and a frame buffer circuit 180B to store the enhanced image EM2, so as to adjust the frame refresh rate of the enhanced image EM2 having the second timing.

In some embodiments, in order to make the first image processing path 130A generate an output quickly, the first image processing path may not include any circuit for processing the enhanced image EM1, so as to directly output the enhanced image EMI through the first image output interface 150A to the first electronic apparatus 190A.

In an embodiment, when only one of the first image processing path 130A and the second image processing path 130B includes the frame refresh rate adjusting circuit, e.g., only the second image processing path 130B includes the frame refresh rate adjusting circuit 170B as illustrated in FIG. 2, the second output image OM2 generated after the adjustment performed by the frame refresh rate adjusting circuit 170B has a timing later that that of the first output image OM1 that is generated without the adjustment performed by frame refresh rate adjusting circuit.

As a result, the image processing circuit having output timing adjustment mechanism of the present invention perform image enhancement first with a common processing path and subsequently set different timings according to different requirements of different image processing paths, so as to generate different image outputs corresponding to different image output interfaces. Such a design not only allows different paths share the image enhancement circuit to reduce the cost, but also allows different timings of the image to be set for the different paths such that different processing can be performed. An elastic image output mechanism can be accomplished.

Reference is now made to FIG. 3. FIG. 3 illustrates a flow chart of an image processing method 300 having output timing adjustment mechanism according to an embodiment of the present invention.

Besides the apparatus described above, the present invention further discloses the image processing method 300 that can be used in such as, but not limited to the image processing circuit 100 illustrated in FIG. 1. An embodiment of the image processing method 300 is illustrated in FIG. 3 and includes the steps outlined below.

In step S310, the input image IMI is received by the image input interface 110.

In step S320, image enhancement is performed on the input image IMI to generate the enhanced image EMI by the image enhancement circuit 120.

In step S330, the original timing of the enhanced image EMI is adjusted by the timing control circuit 140 according to a processing requirement of each of the first image processing path 130A and the second image processing path 130B to generate the enhanced image EM1 having the first timing and the enhanced image EM2 having the second timing.

In step S340, processing is performed on the enhanced image EM1 having the first timing to generate the first output image OM1 by the first image processing path 130A.

In step S350, processing is performed on the enhanced image EM2 having the second timing to generate the second output image OM2 by the second image processing path 130B.

In step S360, the first output image OM1 is outputted by the first image output interface 150A.

In step S370, the second output image OM2 is outputted by the second image output interface 150B.

It is appreciated that the embodiments described above are merely an example. In other embodiments, it is appreciated that many modifications and changes may be made by those of ordinary skill in the art without departing, from the spirit of the invention.

In summary, the image processing circuit and the image processing method having output timing adjustment mechanism of the present invention perform image enhancement first with a common processing path and subsequently set different timings according to different requirements of different image processing paths, so as to generate different image outputs corresponding to different image output interfaces. Such a design not only allows different paths share the image enhancement circuit to reduce the cost, but also allows different timings of the image to be set for the different paths such that different processing can be performed. An elastic image output mechanism can be accomplished.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image processing circuit having output timing adjustment mechanism, comprising:
   an image input interface configured to receive an input image;
   an image enhancement circuit configured to perform image enhancement on the input image to generate an enhanced image;
   a first image processing path configured to perform processing on a first timing enhanced image having a first timing to generate a first output image;
   a second image processing path configured to perform processing on a second timing enhanced image having a second timing to generate a second output image;
   a timing control circuit configured to adjust an original timing of the enhanced image according to a processing requirement of each of the first image processing path and the second image processing path to generate the first timing enhanced image having the first timing and the second timing enhanced image having the second timing;
   a first image output interface configured to output the first output image; and
   a second image output interface configured to output the second output image.

2. The image processing circuit of claim 1, wherein the timing control circuit is configured to modify a timing of a vertical synchronization signal, a horizontal synchronization signal, a vertical blanking interval, a horizontal blanking interval, an active data location or a combination thereof to adjust the original timing.

3. The image processing circuit of claim 1, wherein the image enhancement circuit is configured to perform image enlargement, edge enhancement, sharpness enhancement, artificial intelligence super resolution or a combination thereof.

4. The image processing circuit of claim 1, wherein the first image output interface is configured to output the first output image to a first electronic apparatus that is an image playback apparatus and the processing requirement of the first image processing path comprises an instant playback requirement and a first interface requirement of the first image output interface.

5. The image processing circuit of claim 4, wherein the second image output interface is configured to output the second output image to a second electronic apparatus that is a non-playback apparatus and the processing requirement of the second image processing path comprises a recording requirement and a second interface requirement of the second image output interface.

6. The image processing circuit of claim 1, wherein a path delay of the first image processing path is smaller than a frame delay time.

7. The image processing circuit of claim 1, wherein each of the first image processing path and the second image processing path comprises a resolution adjusting circuit, a frame refresh rate adjusting circuit or a combination thereof.

8. The image processing circuit of claim 7, wherein the second image processing path comprises a frame buffer circuit configured to store the second timing enhanced image having the second timing corresponding to the frame refresh rate adjusting circuit.

9. The image processing circuit of claim 7, wherein one of the first image processing path and the second image processing path comprises the frame refresh rate adjusting circuit such that a first one of the first output image and the second output image that is generated after the adjustment performed by the frame refresh rate adjusting circuit has a timing later that that of a second one of the first output image and the second output image that is generated without the adjustment performed by frame refresh rate adjusting circuit.

10. An image processing method having output timing adjustment mechanism used in an image processing circuit, comprising:

receiving an input image by an image input interface;

performing image enhancement on the input image to generate an enhanced image by an image enhancement circuit;

adjusting an original timing of the enhanced image by a timing control circuit according to a processing requirement of a first image processing path and a second image processing path to generate a first timing enhanced image having a first timing and a second timing enhanced image having a second timing;

performing processing on the first timing enhanced image having the first timing to generate a first output image by a first image processing path;

performing processing on the second timing enhanced image having the second timing to generate a second output image by a second image processing path;

outputting the first output image by a first image output interface; and outputting the second output image by a second image output interface.

11. The image processing method of claim 10, wherein the timing control circuit is configured to modify a timing of a vertical synchronization signal, a horizontal synchronization signal, a vertical blanking interval, a horizontal blanking interval, an active data location or a combination thereof to adjust the original timing.

12. The image processing method of claim 10, further comprising:

performing image enlargement, edge enhancement, sharpness enhancement, artificial intelligence super resolution or a combination thereof by the image enhancement circuit.

13. The image processing method of claim 10, further comprising:

outputting the first output image by the first image output interface to a first electronic apparatus that is an image playback apparatus and the processing requirement of the first image processing path comprises an instant playback requirement and a first interface requirement of the first image output interface.

14. The image processing method of claim 13, further comprising:

outputting the second output image by the second image output interface to a second electronic apparatus that is a non-playback apparatus and the processing requirement of the second image processing path comprises a recording requirement and a second interface requirement of the second image output interface.

15. The image processing method of claim 10, wherein a path delay of the first image processing path is smaller than a frame delay time.

16. The image processing method of claim 10, wherein each of the first image processing path and the second image processing path comprises a resolution adjusting circuit, a frame refresh rate adjusting circuit or a combination thereof.

17. The image processing method of claim 16, wherein the second image processing path comprises a frame buffer circuit, the image processing method further comprises:

storing the second timing enhanced image having the second timing corresponding to the frame refresh rate adjusting circuit by the frame buffer circuit.

18. The image processing method of claim 16, wherein one of the first image processing path and the second image processing path comprises the frame refresh rate adjusting circuit such that a first one of the first output image and the second output image that is generated after the adjustment performed by frame refresh rate adjusting circuit the has a timing later that that of a second one of the first output image and the second output image that is generated without the adjustment performed by frame refresh rate adjusting circuit.

* * * * *